(12) United States Patent
Falk et al.

(10) Patent No.: US 8,198,337 B2
(45) Date of Patent: Jun. 12, 2012

(54) DEMULSIFIER COMPOSITIONS AND METHODS FOR SEPARATING EMULSIONS USING THE SAME

(75) Inventors: Benjamin Falk, Yorktown Heights, NY (US); Kalman Koczo, Suffern, NY (US); Monjit Phukan, Bangalore (IN); Antonio Palumbo, Siracusa (IT); Anubhav Saxena, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 396 days.

(21) Appl. No.: 12/694,676

(22) Filed: Jan. 27, 2010

(65) Prior Publication Data

US 2011/0184075 A1 Jul. 28, 2011

(51) Int. Cl.
*B01F 3/00* (2006.01)
*C07F 7/00* (2006.01)
*C07F 7/02* (2006.01)

(52) U.S. Cl. ............ 516/144; 516/9; 556/450; 556/453

(58) Field of Classification Search .............. 516/9, 144; 556/450, 453
See application file for complete search history.

(56) References Cited

U.S. PATENT DOCUMENTS

| 5,213,804 | A | * | 5/1993 | Martin et al. ............... 424/450 |
| 5,356,633 | A | * | 10/1994 | Woodle et al. .............. 424/450 |
| 5,981,613 | A | * | 11/1999 | Cobb et al. .................. 521/112 |
| 5,985,948 | A | * | 11/1999 | Burkhart et al. ............. 521/112 |
| 6,207,717 | B1 | * | 3/2001 | Lin et al. .................... 514/772.1 |
| 6,291,622 | B1 | * | 9/2001 | Drose et al. .................... 528/31 |
| 6,414,139 | B1 | * | 7/2002 | Unger et al. .................. 556/413 |
| 6,642,309 | B2 | * | 11/2003 | Komitsu et al. .............. 525/100 |
| 6,897,280 | B2 | * | 5/2005 | Heisler et al. .................. 528/15 |
| 2001/0004646 | A1 | * | 6/2001 | Burkhart et al. ............. 521/110 |
| 2006/0173072 | A1 | * | 8/2006 | Yamaguchi et al. ......... 514/475 |
| 2007/0125716 | A1 | | 6/2007 | Procter et al. |
| 2007/0249502 | A1 | | 10/2007 | Procter et al. |
| 2008/0262143 | A1 | * | 10/2008 | Sato et al. .................... 524/547 |

FOREIGN PATENT DOCUMENTS

WO 2007067728 6/2007

* cited by examiner

*Primary Examiner* — Robert S Loewe
(74) *Attorney, Agent, or Firm* — Dominick G. Vicari

(57) ABSTRACT

The present invention provides for a demulsifying composition comprising a blend of a) an emulsion; and b) a demulsifying-effective amount of a non-crosslinked silicon polyether. The present invention also provides for a method for separating emulsions using the demulsifying composition discussed.

20 Claims, No Drawings

DEMULSIFIER COMPOSITIONS AND METHODS FOR SEPARATING EMULSIONS USING THE SAME

FIELD OF THE INVENTION

The present invention relates to demulsifying compositions comprising branched silicon polyether based compositions, processes for their preparation, and their use as demulsifying agents.

BACKGROUND OF THE INVENTION

It is well known that emulsions often cause difficulties in industrial processing operations. For this reason, the emulsified components need to be separated. Often, one or more chemicals, known as demulsifiers, are used for this purpose.

For example, during crude oil processing, it is commonplace for water to become emulsified in the oil. The emulsified water is problematic from several standpoints, most notably as a corrosive to pipelines and as a disruptor to oil distillation processes. The resulting water-in-oil emulsion is typically highly stable as a result of natural surfactants (e.g., naphthenic acids, asphaltenes, and resins) in the crude oil.

To disrupt the stabilized water-in-oil emulsions in crude oil, specialized demulsifiers have been used. See, for example, U.S. Pat. Nos. 5,004,559, 4,183,820, 3,677,962, and British Patent No. GB 1439793, all of which disclose the use of polyoxyalkylene-polysiloxane copolymers as demulsifiers in crude oil or petroleum processing. However, there remains a need for demulsifiers capable of breaking and/or separating such emulsions more effectively.

Recently, branched, non-crosslinked organo-modified polysiloxane compositions comprising multiple siloxane chains bonded to a core via covalent bonds have been produced and identified by the present invention as having improved demulsification properties. These materials have shown unexpected and superior properties as demulsifying agents, in particular as demulsifying agents used in the processing of crude-oil mixtures.

The branched organo-modified polysiloxane compositions and their uses are further described in the sections below.

SUMMARY OF THE INVENTION

According to one aspect of the present invention, a composition is provided comprising a blend of an emulsion and a demulsifying-effective amount of at least one non-crosslinked silicon polyether.

According to another aspect of the present invention the emulsion component (a) of the composition provided is made from at least two immiscible liquid phases, one of which is continuous phase and another is a discontinuous phase of the emulsion.

According to one embodiment of the present invention, one of the immiscible liquids In the emulsion is generally polar, generally water based and the other liquid is generally non-polar and generally defined as an oil phase.

According to yet another aspect of the invention, there is further provided compositions wherein the demulsifying-effective amount of the non-crosslinked silicon polyether composition (b) is at least one compound with the following formula;

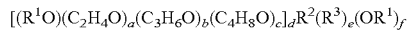

wherein
$R^1$ is a monovalent radical defined as

wherein
$M = R^4R^5R^6SiO_{1/2}$;
$M^A = R^7R^8R^9SiR^{10}$;
$M^B = [(R^{11}R^{12}R^{13}Si)_sR^{14}]_tSi(R^{15})_u(R^{16})_vR^{17}$
$M^H = R^{18}Si(R^{19})(R^{20})O_{1/2}$;
$M^E = R^{21}R^{22}R^ESiO_{1/2}$;
$D = R^{23}R^{24}SiO_{2/2}$;
$D^H = R^{25}Si(R^{26})O_{2/2}$;
$D^E = R^{27}R^ESiO_{2/2}$;
$T = R^{28}SiO_{3/2}$;
$T^H = R^{29}SiO_{3/2}$;
$T^E = R^ESiO_{2/2}$; and
$Q = SiO_{4/2}$;
where $R^2$ and $R^{14}$ are polyvalent linear or branched unsaturated or saturated hydrocarbon radicals optionally containing heteroatoms and hydroxyl groups subject to the limitation that the valency of $R^2$ and $R^{14}$ is at least two and said $R^2$ and $R^{14}$ each contain less than about 25 carbon atoms;
$R^3$ is $—(C_2H_4O)_{aa}(C_3H_6O)_{bb}(C_4H_8O)_{cc}—R^{30}$ or $R^1$;
$R^{30}$ is a monovalent saturated or unsaturated hydrocarbon radical having from 1 to about 20 carbon atoms;
$R^4$, $R^5$, $R^6$, $R^7$, $R^8$, $R^9$, $R^{11}$, $R^{12}$, $R^{13}$, $R^{15}$, $R^{16}$, $R^{19}$, $R^{20}$, $R^{21}$, $R^{22}$, $R^{23}$, $R^{24}$, $R^{26}$, $R^{27}$, and, $R^{28}$ are each independently selected from the group of monovalent hydrocarbon radicals having from 1 to about 10 carbon atoms or $OR^{31}$;
$R^{31}$ is a monovalent hydrocarbon radical that optionally contains heteroatoms having 1 to about 10 carbon atoms;
$R^{10}$, $R^{17}$, $R^{18}$, $R^{25}$ and $R^{29}$ are independently selected from the group of divalent hydrocarbon radicals having 1 to about 25 carbon atoms;
$R^E$ is $—R^{32}—(C_2H_4O)_a(C_3H_6O)_b(C_4H_8O)_c—R^{33}$;
$R^{32}$ is a divalent hydrocarbon radical having from 1 to about 60 carbon atoms;
$R^{33}$ is a monovalent saturated or unsaturated hydrocarbon radical having from 1 to about 20 carbon atoms;
subscript h is 0 or 1 subject to the limitation if h is 1 then $g+i+j+k+l+m+n+o+p+q+r=0$;
subscript d is positive subject to the limitation $1<d+e+f\leq 25$ subject to the limitation that the sum $d+e+f$ is equal to the valency of $R^2$ and $1<d+f$;
subscripts e and f are zero or positive;
subscripts a, b and c are zero or positive subject to the limitation $0<a+b+c\leq$ about 300;
subscripts aa, bb and cc are zero or positive subject to the limitation $0<aa+bb+cc\leq$ about 300;
the subscripts g, h, i, j, k, l, m, n, o, p, q and r are zero or positive and have values ranging from about 0 to about 300;
subscript s is positive subject to the limitation $0<s<25$ and s is equal to the valency of $R^{14}$ minus 1; and
subscripts t, u, and v are each independently zero or positive subject to the limitations $1\leq t$ and $t+u+v=3$.

The present invention is also directed to demulsifying agents in general and particularly in the oil and gas business comprising the non-crosslinked silicon polyether compositions of the present invention.

The present invention is also directed to methods for producing the non-crosslinked silicon polyether compositions of the present invention.

Additional embodiments are also part of the present invention, each of which are further described in the Detailed Description of the invention below.

DETAILED DESCRIPTION OF THE INVENTION

The present invention is directed to compositions comprising a blend of
 a. an emulsion; and
 b. a demulsifying-effective amount of a non-crosslinked silicon polyether.

According to present invention, there is further provided compositions wherein the emulsion component (a) is made from at least two immiscible liquid phases, one of which is continuous phase and another, which is discontinuous phase of the emulsion.

As is generally known, emulsions comprise at least two immiscible liquid phases, one of which is continuous and the other, which is discontinuous. Further, emulsions may also contain gases and solids. For the purpose of this disclosure, the term "immiscible" means that the two liquids have no or limited solubility in each other.

One of the immiscible liquids in an emulsion is generally polar, and often water based and the other liquid is generally non-polar, generally defined as an oil phase. The emulsion can be, for example, a water-in-oil, or an oil-in-water emulsion. In addition, it is also possible to prepare emulsions of emulsions and these are generally known as multiple emulsions, such as water-in-oil-in-water, oil-in-water-in-oil etc.

The emulsions of the present invention are those wherein the discontinuous (emulsified) component is in the form of droplets with droplet sizes in the range of about 0.1 microns up to about 500 microns and more typically in the range of about 1 to about 100 microns. The emulsified component can be unstabilized, but is more typically stabilized by a stabilizing amount of a surfactant, a polymer and/or dispersed particulate solid.

The aqueous phase can be essentially pure water, or alternatively, water with varying amounts of solid (particulate) materials, salt or other chemicals.

The oil phase of the emulsion of the present invention is any hydrophobic phase substantially insoluble with the aqueous phase. For example, the oil phase can be composed of one or more hydrophobic chemicals, typically liquids, which individually or in combination are mainly insoluble in the aqueous phase. Such hydrophobic chemicals can be, for example, linear or branched, cyclic or acyclic, saturated or unsaturated, aliphatic or aromatic hydrocarbons. The hydrocarbons of the present invention typically contain at least about six carbon atoms and can be unsubstituted, or alternatively, substituted with one or more heteroatom-containing group (e.g., hydroxyl, amino, carboxyl, amide, anhydride, ester, or ether groups) as long as the hydrocarbons remain mainly insoluble with the aqueous phase.

Some examples of oil phases include, but are not limited to, halogenated or non-halogenated hydrocarbons having about 2 to about 30 carbons atoms, and more particularly, halogenated or non-halogenated ethenes, butadienes, pentanes, hexanes, heptanes, octanes, benzenes, toluene, ethylbenzenes, xylenes, naphthalene, cresols, naphtha, fats, lubrication oils, petroleum, gasoline, diesel fuel, crude oil, fuel oils, jet fuels, heating oils, cleaning oils, vegetable oils, mineral oils, and tar or bitumen derivatives.

Demulsifiers are used to separate emulsions into polar (typically water) and non-polar liquids by incorporating the demulsifying agent into the emulsion. Demulsifiers are known in the art and usually comprise blends of surface-active chemicals. Typical organic demulsifier structures include, but not limited to sulfonates, sulfosuccinates, polyol esters, polyester amines, polymeric elastomers, sulfated polyol ester, oxyalkylated phenolic resins, alkylphenol alkoxylates, amine alkoxylates, quaternary amines, ethoxylated amines, bisamides, polyalkylene glycols, polymerized polyols, resin esters, polyether polyols, resin alkoxylates, modified polyols, polyimine alkoxylates and diepoxides. Silicone demulsifiers typically include, but not limited to copolymers of polydimethylsiloxanes and polyalkylane oxides (silicone polyethers), alkylsillcones and alkylsilicone polyethers, arylsilicones and arylsilicone polyethers, aralkylsilicones and aralkylsilicone polyethers, organosilanes, alkoxysilanes.

However, despite the large number of demulsifiers available on the market, it is not possible to rapidly breakdown all of the petroleum/water emulsions experienced in the petroleum filed today safely, efficiently, and with small quantities of addition products.

According to one embodiment of the present invention, there is further provided compositions wherein the demulsifying-effective amount of a non-crosslinked silicon polyether composition (b) includes at least one compound with the following formula;

$$[(R^1O)(C_2H_4O)_a(C_3H_6O)_b(C_4H_8O)_c]_d R^2(R^3)_e(OR^1)_f$$

wherein
R$^1$ is a monovalent radical defined as $$M_g M^A_h M^B_i M^H_j M^E_k D_l D^H_m D^E_n T_o T^H_p T^E_q Q_r$$

wherein
$M = R^4 R^5 R^6 SiO_{1/2}$;
$M^A = R^7 R^8 R^9 SiR^{10}$;
$M^B = [(R^{11} R^{12} R^{13} Si)_s R^{14}]_t Si(R^{15})_u (R^{16})_v R^{17}$
$M^H = R^{18} Si(R^{19})(R^{20})O_{1/2}$;
$M^E = R^{21} R^{22} R^E SiO_{1/2}$;
$D = R^{23} R^{24} SiO_{2/2}$;
$D^H = R^{25} Si(R^{26})O_{2/2}$;
$D^E = R^{27} R^E SiO_{2/2}$;
$T = R^{28} SiO_{3/2}$;
$T^H = R^{29} SiO_{3/2}$;
$T^E = R^E SiO_{2/2}$; and
$Q = SiO_{4/2}$;

where R$^2$ and R$^{14}$ are polyvalent linear or branched unsaturated or saturated hydrocarbon radicals optionally containing heteroatoms and hydroxyl groups subject to the limitation that the valency of R$^2$ and R$^{14}$ is at least two and said R$^2$ and R$^{14}$ each contain less than about 25 carbon atoms, preferably at least one and less than about 20 carbon atoms, and more preferably at least one and less than about 15 carbon atoms;

$$R^3 \text{ is } —(C_2H_4O)_{aa}(C_3H_6O)_{bb}(C_4H_8O)_{cc}—R^{30} \text{ or } R^1;$$

R$^{30}$ is a monovalent saturated or unsaturated hydrocarbon radical having from 1 to about 20 carbon atoms, preferably from 1 to about 10 carbon atoms and more preferably from 1 to about 5 carbon atoms;
R$^4$, R$^5$, R$^6$, R$^7$, R$^8$, R$^9$, R$^{11}$, R$^{12}$, R$^{13}$, R$^{15}$, R$^{16}$, R$^{19}$, R$^{20}$, R$^{21}$, R$^{22}$, R$^{23}$, R$^{24}$, R$^{26}$, R$^{27}$, and, R$^{28}$ are each independently selected from the group of monovalent hydrocarbon radicals having from 1 to about 10 carbon atoms, preferably from zero to about 5 carbon atoms and more preferably from zero to about 3 carbon atoms or OR$^{31}$;
R$^{31}$ is a monovalent hydrocarbon radical that optionally contains heteroatoms having 1 to about 10 carbon atoms, preferably from zero to about 5 carbon atoms;
R$^{10}$, R$^{17}$, R$^{18}$, R$^{28}$ and R$^{29}$ are each independently selected from the group of divalent hydrocarbon radicals having 1 to about 25 carbon atoms, preferably from zero to about 20 carbon atoms and more preferably from 3 to about 10 carbon atoms;

$$R^E \text{ is } —R^{32}—(C_2H_4O)_a(C_3H_6O)_b(C_4H_8O)_c—R^{33};$$

$R^{32}$ is a divalent hydrocarbon radical having from 1 to about 60 carbon atoms, preferably from zero to about 20 carbon atoms and more preferably from 3 to about 10 carbon atoms; $R^{33}$ is a monovalent saturated or unsaturated hydrocarbon radical having from 1 to about 20 carbon atoms, preferably from zero to about 10 carbon atoms and more preferably from zero to about 5 carbon atoms; subscript h is 0 or 1 subject to the limitation if h is 1 then g+i+j+k+l+m+n+o+p+q+r=0; subscript d is positive subject to the limitation 1<d+e+f≦about 25 subject to the limitation that the sum d+e+f is equal to the valency of $R^2$ and 1<d+f;
subscripts e and f are zero or less than or equal to 24;
subscripts a, b and c are zero or positive subject to the limitation 0<a+b+c≦about 300, preferably 0<a+b+c≦about 250 and more preferably 1<a+b+c≦about 200;
subscripts aa, bb and cc are zero or positive subject to the limitation 0<aa+bb+cc≦about 300, preferably 0<aa+bb+cc≦about 250 and more preferably 1<aa+bb+cc≦about 200;
subscripts g, h, i, j, k, l, m, n, o, p, q and r are zero or positive having values ranging from 0 to about 300, preferably zero to about 250 carbon atoms, and more preferably zero to less than about 15 carbon atoms;
subscript s is positive subject to the limitation 0<s<25, preferably 0<s<20 and more preferably 0<s<10 and s is equal to the valency of $R^{14}$ minus 1; and subscripts t, u, and v are zero or positive subject to the limitations 1≦t and t+u+v is equal to about 3.

Another embodiment of the present invention is directed a composition wherein the non-crosslinked silicon polyether component (b) of the present invention comprises the compound having the following formula;

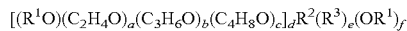

wherein
$R^1$ is $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript b is about 5 to about 50;
subscripts c and e are 0;
subscript d is about 3; and
$R^2$ is a trivalent hydrocarbon having about 3 to about 10 carbon atoms.

Yet another embodiment of the present invention is directed to a composition wherein the non-crosslinked silicon polyether component (b) of the present invention comprises the compound having the following formula;

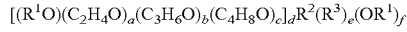

wherein
$R^1$ is $(CH_3)_3SiOSi(R^{25})(CH_3)OSi(CH_3)_3$;
$R^{25}$ is a divalent hydrocarbon having about 3 to about 10 carbon atoms;
subscripts a and d are about 4;
subscript b, c and e are 0;
$R^2$ is a tetravalent hydrocarbon with about 4 to about 20 carbon atoms.

Still yet another embodiment of the present invention is directed to composition wherein the non-crosslinked silicon polyether component (b) of the present invention comprises the compound having the following formula;

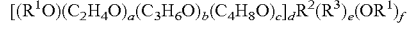

wherein
$R^1$ and $R^3$ are $(CH_3)_3SiCH_2CH_2Si(CH_3)_2)R^{17}$;
$R^{17}$ is a divalent hydrocarbon having about 3 to about 10 carbon atoms;

subscript a is about 5 to about 50;
subscript b is 0 to about 10;
subscript c is 0;
$R^2$ is $CH_3CH_2C(CH_2-)_2(CH_2O-)$ where $R^3$ is connected to the O atom in $R^2$;
subscript d is about 2; and
subscript e is about 1.

Another embodiment of the present invention is directed to a composition wherein the non-crosslinked silicon polyether component (b) of the present invention comprises the compound having the following formula;

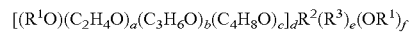

wherein
$R^1$ and $R^3$ are $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript d is about 2;
subscript e is about 1;
subscripts b and c are each 0; and
$R^2$ is $CH_3CH_2C(CH_2-)_2(CH_2O-)$ where $R^3$ is connected to the O atom in $R^2$.

Still yet another aspect of the present invention is directed to a composition wherein the non-crosslinked silicon polyether component (b) of the present invention comprises the compound having the following formula;

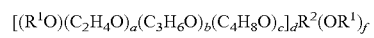

wherein
subscript d is 0;
$R^1$ is $M^E D_l M^H$;
$M^E$ is $R^{33}O(CH_2CH_2O)_a(CH_2CH_2(CH_3)O)_b(CH_2CH_2(CH_2CH_3)O)_c R^{32}-$
$R^{32}$ is a divalent, linear or branched hydrocarbon radical having 3 to about 6 carbon atoms;
$R^{33}$ is H, $CH_3C(=O)O-$, or a monovalent hydrocarbon radical having 1 to about 10 carbon atoms;
$M^H=R^{18}Si(R^{19})(R^{20})O_{1/2}$;
$D=R^{23}R^{24}SiO_{2/2}$;
$R^{18}$ is a linear or branched monovalent hydrocarbon radical having 3 to about 10 carbon atoms;
$R^{19}$, $R^{20}$, $R^{23}$ and $R^{24}$ are monovalent hydrocarbon radicals having 1 to about 3 carbon atoms;
subscript a is about 5 to about 50;
subscripts b and c are about 0 to about 50;
subscript l is 0 to about 300;
$R^2$ is a hydrocarbon radical having about 3 to about 12 carbon atoms with a valency in the range of about 2 to about 6;
subscript f is about 2 to about 6.

The ratio of the demulsifying-effective amount of non-crosslinked silicon polyether composition (b) to the emulsion component (a) is 0.00001 to about 1 parts of (b) to about 100 parts of (a), preferably is 0.0001 to about 0.1 parts of (b) to about 100 parts of (a) and more preferably is about 0.0001 to about 0.02 parts of (b) to about 100 parts of (a).

Another embodiment of the present invention is directed to a method for separating emulsions using the non-crosslinked silicon polyether compositions of the present invention. The method comprising the following steps:
  (i) incorporating a demulsifying-effective amount of a non-crosslinked silicon polyether (b) of the present invention into an emulsion to form a new emulsion;
  (ii) allowing the new emulsion to separate into at least two phases; and
  (iii) separating said at least two phases from each other.

Additional embodiments of the invention include the method for separating emulsions discussed immediately above wherein one or more of disclosed component (b) of the demulsifying agent is used.

In the specification and claims herein, the following terms and expressions are to be understood as indicated.

The expression "hydrocarbon radicals" means any hydrocarbon group from which one or more hydrogen atoms has been removed and is inclusive of alkyl, alkenyl, alkynyl, cyclic alkyl, cyclic alkenyl, cyclic alkynyl, aryl, aralkyl and arenyl and may contain heteroatoms.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornane and ethylidene norbornenyl. Examples of alkynyls include acetylenyl, propargyl and methylacetylenyl.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The term "cross-linked polymers" means polymer molecules which are built from monomers which are linked together at many points other than their ends and as a result molecules with large size form and the material is non-pourable solid or gel-like which cannot be dissolved in any solvent.

The copolymers in our invention are "non-crosslinked", which means that their monomers are either not linked together at points other than their ends or the linkages between the polymers are so few that the copolymer is either liquid or can be dissolved in at least one solvent.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name, or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In describing the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Thus for example finely divided solids such as pigments may be dispersed into the reaction mixture, before during or after reaction to produce a reaction product composition that additionally comprises the non-reactive component, e.g. a pigment. Additional reactive components may also be added; such components may react with the initial reactants or they may react with the reaction product; the phrase "reaction product" is intended to include those possibilities as well as including the addition of non-reactive components.

Other optional ingredients may be added in the compositions of the present invention including coupling agents, e.g., silane coupling agents, curing aids, e.g., including activators, retarders and accelerators, processing additives such as oils, plasticizers, tackifying resins, silicas, other fillers, pigments, fatty acids, zinc oxide, waxes, antioxidants and antiozonants, peptizing agents, reinforcing materials such as, for example, carbon black, and so forth. Such additives are selected based upon the intended use and such selection is within the knowledge of one of skill in the art, as are the required amounts of such additives known to one of skill in the art.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

Applications for Embodiments of the Invention

A. Mining and Petroleum Industry

Emulsions can create problems in the Mining and Petroleum Industry because the emulsions often do not separate into the liquid components for a prolonged time. In this case typically chemical additives, so-called demulsifying agents, are added to initiate, accelerate and complete the separation process. Demulsifying agents break emulsions and mixtures of polar solutes like water, and non-polar solvents like oil.

The compositions of the present invention may be utilized in mining and petroleum processing applications, especially for demulsification.

Using the compositions of the present invention for demulsification is accomplished by i. combining a demulsifying-effective amount of at least one composition of component (b) of the present invention with an emulsion component (a) including crude-oil or the like;

ii. allowing the emulsion to separate into at least two phases; and iii. separating said at least two phases from each other.

The compositions described in the present invention can be used for demulsification as is or accompanied by additional silicone and/or organic demulsifiers and these components can be utilized in the form of a blend, a solution, a dispersion, or either an oil-in-water or a water-in-oil emulsion or microemulsion or the various demulsifying agents can be added separately. When applied in solution suitable solvents can be selected from linear or branched, cyclic or acyclic, saturated or unsaturated, aliphatic or aromatic hydrocarbons, alcohol, ketones, esters, ethers and their blends or whatever solvent is commonly used in the particular application.

When both organic and silicone demulsifier components (b) are included, the weight ratio of component (b) of the present invention to the total amount of the organic and silicone demulsifiers is typically in the range of about 100:1 to about 1:1000, more typically in the range of about 5:1 to about 1:200.

The incorporation of the demulsifier into the emulsion to be separated can be achieved by any method known in the art for integrally mixing the demulsifier with the emulsion. The mixing procedure can use, for example, standard mixers, high-speed mixers or blenders, or shakers. The temperature can be unadjusted within room temperature limits (~20-30° C.), or adjusted as required, for example, to 40-150° C. for a suitable amount of time.

A typical application of the compositions in the present invention is the separation of crude oil emulsions. During extraction and production of crude oil, water or brine gets emulsified into the crude oil yielding a water-in-oil emulsion, which can be unstabilized or stabilized by surface active materials, organic solids, such as asphaltenes and resins, or inorganic solids. This water-in-oil emulsion gives rise to several down-stream problems; corrosion during refinery processes and greater energy requirement to pump the more viscous emulsion are to name a few. Thus, demulsifiers are extensively used in the petroleum industry, to break water-in-oil and oil-in-water emulsions; and before transportation, refining or processing the water content of the crude oil has to be reduced to pipeline specification levels (typically less then 0.05-2%) and this is typically achieved by injecting demulsifiers into the well, into the crude oil stream, at the separation equipment or at any other suitable points.

The non-crosslinked silicon polyethers of the present invention will cause improved demulsifying action as demulsifying agents in desalters; in bitumen extraction from oils sands (separating bitumen froth and solvent diluted bitumen emulsions); in the separation of waste oils, slop oils, sludges, such as oily waste from desalters, waste water skimmings, refinery and petrochemical plant waste (tank bottom washes, coker drum waste, "dirty bleeds" etc.), steel and aluminum industrial waste, including synthetic lubes, high lithium grease, lube oil from rollers, metalworking fluid waste and paper plant waste.

Dehazing (demulsification) of lubrication oils and lubrication oil waste, such as automotive waste (motor oil etc.), bunker oil are also possible applications of the reaction products in the present invention.

Another typical industrial use of the reaction products in the present invention is diesel fuel (including bio-diesel) dehazing when the demulsifier eliminates small amount of emulsified water from the diesel fuel and diesel fuel antifoaming.

Further applications of the copolymers in the present invention in oil and gas include asphaltene dispersants and drag reduction.

The compositions of the present invention will improve ore recovery from mining operations including mining processes such as flocculation, separation, purification, concentration, leaching & chemical extraction improves the separation of minerals from their gangue.

B. Water Processing

Compositions comprising the non-crosslinked silicon polyethers' of the present invention are useful for applications involving commercial and industrial open recirculating cooling water towers, closed cooling water systems, cooling water conduits, heat exchangers, condensers, once-through cooling systems, Pasteurizers, air washers, heat exchange systems, air conditioning/humidifiers/dehumidifiers, hydrostatic cookers, safety and/or fire water protection storage systems, water scrubbers, disposal wells, influent water systems, including filtration and clarifiers, wastewater treatment, wastewater treatment tanks, conduits, filtration beds, digesters, clarifiers, holding ponds, settling lagoons, canals, odor control, ion exchange resin beds, membrane filtration, reverse osmosis, micro- and ultra-filtration, assisting in the removal of biofilms in cooling tower applications, heat exchangers and process water systems, and the like.

Synthetic Examples

Preparation Example A

A polyether with the average structure of $CH_2$=$C(CH_3)$ $CH_2O(CH_2CH_2O)_9CH_2C(CH_3)$=$CH_2$(150.00 g), sodium propionate (0.15 g), and toluene (70.0 g) were added to a round bottom flask equipped with a Dean-Starke trap filled with toluene, an overhead stirrer, heating mantel and thermocouple. The material was brought to reflux for 2 hrs thus drying the polyether. The reactor was cooled and the Dean-Starke trap was replaced with a condenser. 1,1,1,3,5,5,5-heptamethyltrisiloxane (125.19 g) was added and the reaction was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 8.4 Torr and held for 2 hrs. The product was then pressure filtered through a 5 micron filter pad. The product was liquid with a viscosity of 47.7 cP and exhibited an amber color.

Preparation Example B

A polyether with the average structure of $CH_2=C(CH_3)CH_2O(CH_2CH_2O)_{24}(CH2CH(CH3)O)_6CH2C(CH_3)=CH_2$ (150.00 g) and sodium propionate (0.15 g) were added to a round bottom flask equipped with a condenser, an overhead stirrer, heating mantel and thermocouple, 1,1,1,3,5,5,5-heptamethyltrisiloxane (27.90 g) was added and the reaction was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 10 Torr and held for 2 hrs. Diatomaceous earth, Celite 545 (10 g) was added to the product then pressure filtered through a 5 micron filter pad. The product was liquid with a viscosity of 951.0 cP and exhibited a brown yellow color.

Preparation Example C

A polyether with the average structure of $CH_2=C(CH_3)CH_2O(CH_2CH_2O)_{22.7}CH2C(CH_3)=CH_2$ (100.00 g), sodium propionate (0.15 g), and isopropanol (20.0 g) were added to a round bottom flask equipped with a condenser, an overhead stirrer, heating mantel and thermocouple. 1,1,1,3,5,5,5-heptamethyltrisiloxane (44.06 g) was added and the reaction was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 10 Torr and held for 2 hrs. Diatomaceous earth, Celite 545 (10 g) was added to the product then pressure filtered through a 5 micron filter pad. The product solidified upon standing and exhibited a brown yellow color.

Preparation Example D

Trismethallylchloride capped ethoxylated trimethylolpropane with an average molecular weight of 1000 g/mol (150 g), sodium propionate (0.15 g), and 1,1,1,3,5,5,5-heptamethyltrisiloxane (67.92 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 9.8 Torr and held for 2 hrs. Diatomaceous earth, Celite 545 (5 g) was added to the product then pressure filtered through a 5 micron filter pad. The product was liquid with a viscosity of 165.3 cP and exhibited a clear amber color.

Preparation Example E

Trismethallylchloride capped alkoxylated (14.6 EO and 4.2 PO) glycerol with an average molecular weight of 1000 g/mol (150 g), sodium propionate (0.15 g), and 1,1,1,3,5,5,5-heptamethyltrisiloxane (62.04 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 8.8 Torr and held for 2 hrs. Diatomaceous earth, Celite 545 (5 g) was added to the product then pressure filtered through a 5 micron filter pad. The product was liquid with a viscosity of 137.4 cP and exhibited a clear amber color.

Preparation Example F

Trismethallylchloride capped alkoxylated (58.3 EO and 10.5 PO) glycerol with an average molecular weight of 3600 g/mol (150 g), sodium propionate (0.15 g), and 1,1,1,3,5,5,5-heptamethyltrisiloxane (27.17 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 9.2 Torr and held for 2 hrs. Diatomaceous earth, Celite 545 (5 g) was added to the product then pressure filtered through a 5 micron filter pad. The product was liquid with a viscosity of 856.5 cP and exhibited a dark brown color.

Preparation Example G

Trismethallylchloride capped alkoxylated (68.7 EO and 25.6 PO) glycerol with an average molecular weight of 4900 g/mol (150 g), sodium propionate (0.15 g), and 1,1,1,3,5,5,5-heptamethyltrisiloxane (19.46 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 9.2 Torr and held for 2 hrs. Diatomaceous earth, Celite 545 (5 g) was added to the product then pressure filtered through a 5 micron filter pad. The product was liquid with a viscosity of 1171.0 cP and exhibited a clear amber color.

Preparation Example H

Trismethallylchloride capped alkoxylated (15.8 EO and 2.4 PO) glycerol with an average molecular weight of 1000 g/mol (150 g), sodium propionate (0.15 g), and 1,1,1,3,5,5,5-heptamethyltrisiloxane (93.62 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 15.0 Torr and held for 2 hrs. Diatomaceous earth, Celite 545 (5 g) was added to the product then pressure filtered through a 5 micron filter pad. The product was liquid with a viscosity of 136.5 cP and exhibited a clear amber color.

Preparation Example I

Trismethallylchloride capped ethoxylated (50 EO) glycerol with an average molecular weight of 2300 g/mol (76.9 g), sodium propionate (0.05 g), and 1,1,1,3,5,5,5-heptamethyltrisiloxane (23.1 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 15.0 Torr and held for 2 hrs. Diatomaceous earth, Celite 545 (5 g) was added to the product then pressure filtered through a 5 micron filter pad. The product was solidified upon standing and exhibited a clear light amber color.

Preparation Example J

Trismethallylchloride capped ethoxylated (20 EO) glycerol with an average molecular weight of 1000 g/mol (60.6 g), sodium propionate (0.05 g), and 1,1,1,3,5,5,5-heptamethyltrisiloxane (39.4 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 15.0 Torr and held for 2 hrs. Diatomaceous earth, Celite 545 (5 g) was added to the product then pressure filtered through a 5 micron filter pad. The product was a liquid with a viscosity of 128.4 cP and exhibited a clear light amber color.

Preparation Example K

Trismethallylchloride capped ethoxylated (20 EO) trimethylolpropane with an average molecular weight of 1200 g/mol (61.4 g), sodium propionate (0.05 g), and 1,1,1,3,5,5,5-heptamethyltrisiloxane (38.6 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 15.0 Torr and held for 2 hrs. Diatomaceous earth, Celite 545 (5 g) was added to the product then pressure filtered through a 5 micron filter pad. The product was a liquid with a viscosity of 163.2 cP and exhibited a clear light amber color.

Preparation Example L

Tetramethallylchloride capped ethoxylated (15 EO) penthaerithrytol with an average molecular weight of 800 g/mol (150.0 g), sodium propionate (0.15 g), and 1,1,1,3,5,5,5-heptamethyltrisiloxane (125.92 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 12.0 Torr and held for 2 hrs. Diatomaceous earth, Celite 545 (5 g) was added to the product then pressure filtered through a 5 micron filter pad. The product was a liquid with a viscosity of 99.6 cP and exhibited a clear light amber color.

Preparation Example M

Bismethallylchloride capped ethoxylated (50 EO) trimethylolpropane monoallyl ether with an average molecular weight of 2400 g/mol (150.0 g), sodium propionate (0.15 g), and 1,1,1,3,5,5,5-heptamethyltrisiloxane (44.42 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 10.0 Torr and held for 2 hrs. Diatomaceous earth, Celite 545 (5 g) was added to the product then pressure filtered through a 5 micron filter pad. The product solidified upon standing and exhibited a clear light amber color.

Preparation Example N

Bismethallylchloride capped ethoxylated (20 EO) trimethylolpropane monoallyl ether with an average molecular weight of 1050 g/mol (150.0 g), sodium propionate (0.15 g), and 1,1,1,3,5,5,5-heptamethyltrisiloxane (95.45 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 12.0 Torr and held for 2 hrs. Diatomaceous earth, Celite 545 (5 g) was added to the product then pressure filtered through a 5 micron filter pad. The product was a liquid with a viscosity of 163 cP and exhibited a clear light amber color.

Preparation Example O

Bismethallylchloride capped ethoxylated (20 EO) trimethylolpropane monoallyl ether with an average molecular weight of 1050 g/mol (200.0 g), sodium propionate (0.15 g), and 1-trimethylsilyl-2-dimethylsilylethane (95.4 g) were added to a round bottom flask equipped with a condenser, an overhead stirrer, heating mantel and thermocouple. The reaction medium was heated to 85° C. Karstedt's catalyst (25 ppm Pt) was added and the reaction medium was stirred for 16 hrs. An infrared spectrum was taken to insure completion of the reaction. The product was transferred to a single neck flask and placed on a rotary evaporator in an oil bath at 120° C. Using a nitrogen sparge the flask was evacuated to 12.0 Torr and held for 2 hrs. Diatomaceous earth, Celite 545 (5 g) was added to the product then pressure filtered through a 5 micron filter pad. The product was a liquid and exhibited a clear light amber color.

Preparation Example P

Bismethallylchloride capped ethoxylated (20 EO) trimethylolpropane monoallyl ether with an average molecular weight of 1050 g/mol (100.0 g) and sodium propionate (0.10 g) were added to a round bottom flask equipped with a dry ice condenser, an overhead stirrer, heating mantel and thermocouple. The reaction medium was heated to 85° C. Karstedt's catalyst (25 ppm Pt) was added and trimethylsilane (22.1 g)

was bubbled under the surface of the reaction medium. Once all the silane was added the reaction medium was stirred for an additional 16 hrs. An infrared spectrum was taken to insure completion of the reaction. The product was transferred to a single neck flask and placed on a rotary evaporator in an oil bath at 120° C. Using a nitrogen sparge the flask was evacuated to 12.0 Torr and held for 2 hrs. Diatomaceous earth, Celite 545 (5 g) was added to the product then pressure filtered through a 5 micron filter pad. The product was a liquid and exhibited a clear light amber color.

Preparation Example Q

This laboratory prepared material was obtained from Hydrosilylation reaction between Allyl Pentaerythritol (APE, Perstorp), 1,1,3,3-tetramethyldisiloxane (MHMH, Sigma Aldrich India) and an allyl-started polyether with average formula $CH_2=CHCH_2O(CH_2CH_2O)_{7.5}OH$. A nitrogen blanketed glass reactor fitted with a temperature probe, condenser and magnetic stirrer was charged with 12.9 g of APE, 16.9 g of MHMH and 30 g of IPA. The mixer was heated to 60° C. and 20 ppm of dibutylethanolamine (DBTAE, Sigma Aldrich) and Karstedt's catalyst of 5 ppm equivalent of Pt were added. The reaction was allowed for approximately 2 hr and from $H^1$-NMR consumption of 1 mole of Si—H was confirmed. Then the mixer was heated to 80° C. and 20.2 g of the aforementioned polyether were added. To this, Karstedt's catalyst of 5 ppm equivalent of Pt was added and reaction was allowed to proceed to approximately 3 hrs and completion of the reaction was confirmed by $H^1$-NMR. After completion, IPA was removed under reduced pressure at 80° C.

Preparation Example R

This laboratory prepared material was obtained from Hydrosilylation reaction between Allyl Pentaerythritol (APE, Perstorp), 1,1,3,3-tetramethyldisiloxane (MHMH, Sigma Aldrich India) and an allyl-started polyether with average formula $CH_2=CHCH_2O(CH_2CH_2O)_{16}OH$. A nitrogen blanketed glass reactor fitted with a temperature probe, condenser and magnetic stirrer was charged with 9.1 g of APE, 11.9 g of MHMH and 30 g of IPA. The mixer was heated to 60° C. and 20 ppm of dibutylethanolamine (DBTEA, Sigma Aldrich) and Karstedt's catalyst of 5 ppm equivalent of Pt were added. The reaction was allowed for approximately 2 hr and from $H^1$-NMR consumption of 1 mole of Si—H was confirmed. Then the mixer was heated to 80° C. and 28.2 g of the aforementioned polyether were added. To this, Karstedt's catalyst of 5 ppm equivalent of Pt was added and reaction was allowed to proceed to approximately 5 hrs and completion of the reaction was confirmed by $H^1$-NMR. After completion, IPA was removed under reduced pressure at 80° C.

Preparation Example S

This laboratory prepared material was obtained from Hydrosilylation reaction between Allyl Pentaerythritol (APE, Perstorp), hydride terminated polydimethylsiloxane of molecular weight 580 (Sigma Aldrich India) and an allyl-started polyether with average formula $CH_2=CHCH_2O(CH_2CH_2O)_{16}OH$. A nitrogen blanketed glass reactor fitted with a temperature probe, condenser and magnetic stirrer was charged with 5.1 g of APE, 28.8 g of hydride terminated polydimethylsiloxane and 30 g of IPA. The mixer was heated to 60° C. and 20 ppm of dibutylethanolamine (DBTEA, Sigma Aldrich) and Karstedt's catalyst of 5 ppm equivalent of Pt were added. The reaction was allowed for approximately 2 hr and from $H^1$-NMR consumption of 1 mole of Si—H was confirmed. Then the mixer was heated to 80° C. and 16.1 g of the aforementioned polyether were added. To this, Karstedt's catalyst of 5 ppm equivalent of Pt was added and reaction was allowed to proceed to approximately 5 hrs and completion of the reaction was confirmed by $H^1$-NMR. After completion, IPA was removed under reduced pressure at 80° C.

Preparation Example T

This laboratory prepared material was obtained from Hydrosilylation reaction between Allyl Pentaerythritol (APE, Perstorp), 1,1,3,3-tetramethyldisiloxane (MHMH, Sigma Aldrich India) and an allyl-started polyether with average formula $CH_2=CHCH_2O(CH_2CH_2O)_{12}(CH_2CH(CH_3)O)_{15}OH$ (Momentive Performance Materials, USA). A nitrogen blanketed glass reactor fitted with a temperature probe, condenser and magnetic stirrer was charged with 5.8 g of APE, 7.6 g of MHMH and 30 g of IPA. The mixer was heated to 60° C. and 20 ppm of dibutylethanolamine (DBTEA, Sigma Aldrich) and Karstedt's catalyst of 5 ppm equivalent of Pt were added. The reaction was allowed for approximately 2 hr and from $H^1$-NMR consumption of 1 mole of Si—H was confirmed. Then the mixer was heated to 80° C. and 36.7 g of the aforementioned polyether were added. To this, Karstedt's catalyst of 5 ppm equivalent of Pt was added and reaction was allowed to proceed to approximately 5 hrs and completion of the reaction was confirmed by $H^1$-NMR. After completion, IPA was removed under reduced pressure at 80° C.

Preparation Example U

This laboratory prepared material was obtained from Hydrosilylation reaction between Allyl Pentaerythritol (APE, Perstorp), 1,1,3,3-tetramethyldisiloxane (MHMH, Sigma Aldrich India) and an allyl-started polyether with average formula $CH_2=CHCH_2O(CH_2CH_2O)_{12}OH$. A nitrogen blanketed glass reactor fitted with a temperature probe, condenser and magnetic stirrer was charged with 10.6 g of APE, 13.9 g of MHMH and 30 g of IPA. The mixer was heated to 60° C. and 20 ppm of dibutylethanolamine (DBTEA, Sigma Aldrich) and Karstedt's catalyst of 5 ppm equivalent of Pt were added. The reaction was allowed for approximately 2 hr and from $H^1$-NMR consumption of 1 mole of Si—H was confirmed. Then the mixer was heated to 80° C. and 25.5 g of the aforementioned polyether were added. To this, Karstedt's catalyst of 5 ppm equivalent of Pt was added and reaction was allowed to proceed to approximately 5 hrs and completion of the reaction was confirmed by $H^1$-NMR. After completion, IPA was removed under reduced pressure at 80° C.

Testing Examples

The following test examples illustrate the use of the non-cross-linked silicon polyether compositions in the present invention as demulsifying agents.
Method
Crude oil demulsifiers were tested in the Middle East with fresh crude oil samples from two different oil fields. Field 1 produced heavy crude oil, at 60° C. with about 15° API and Field 2 produced a light crude oil at 40° C. with about 32° API.

First the water cut was determined by blending 50 part (vol.) of crude oil with 50 parts (vol.) of xylenes and with a highly efficient demulsifier in sufficient dose to completely separate the water from the crude. Then this blend was centrifuged for 5 min and the water cut was determined.

In the bottle tests 100 ml of crude oil was placed in centrifuge tubes, the various demulsifiers were added and the bottles were hand shaken 100 times and then the samples were kept in a water bath at the required temperature for a period of time characteristic of the separators at the field. The amount of the separated water was determined at regular intervals. At the end of the separation process the tubes were removed from the bath and the appearance of the separated crude oil, the separated water phase and crude oil/water interface, respectively, were observed. Then a sample was taken from the top 80% of the separated crude oil phase and the residual water content was determined in two steps. First 50 parts (vol.) of crude oil sample was blended with 50 parts (vol.) of xylenes in a centrifuge tube (about 12.5 ml). Then this blend was vigorously shaken by hand and centrifuged for 5 min and the amount of separated water ("FREE WATER", W1) was recorded. Then two drops of a highly efficient demulsifier (knockout dropper) was added, followed by vigorous shaking and centrifuged again, to determine the TOTAL WATER (W2) content. The difference between the TOTAL and FREE water content is the UNRESOLVED EMULSION (ΔW) and it characterized the efficiency of a demulsifier.

Materials:

Org 1 and Org 2 were two, fully formulated organic demulsifier packages which are typically used on Field 1 and Field 2.

Testing Example 1

Separation of Crude Oil Emulsion from Field 1

The original crude sample contained 4% FREE WATER and 29% TOTAL WATER.

Table 1 shows the results after 22 h separation at 60° C. using the typical dose of organic formulations (150 ppm) with and without the silicone examples, respectively. It can be seen that combining 5% silicones (Examples F, M, B or G, respectively) with either Org 1 or Org 2 formulations reduced the amount of unresolved emulsion (ΔW).

TABLE 1

Separation results with crude oil sample from Field 1, at 60° C.

| # | Demulsifier | Total Dose Ppm | WATER DROP 60° C. 5 min | WATER DROP 60° C. 22 h | TOP CUT (80%) W1 | TOP CUT (80%) W2 | TOP CUT (80%) ΔW |
|---|---|---|---|---|---|---|---|
| 1 | Org 1 | 150 | 3 | 10 | 13.0 | 19.0 | 6.0 |
| 2 | Org 1 + Ex. F | 150 + 7.5 | 5 | 11 | 11.0 | 17.0 | 6.0 |
| 3 | Org 1 + Ex. M | 150 + 7.5 | 5 | 10 | 11.0 | 16.0 | 5.0 |
| 4 | Org 1 + Ex. B | 150 + 7.5 | 5 | 11 | 11.0 | 16.0 | 5.0 |
| 5 | Org 1 + Ex. G | 150 + 7.5 | 5 | 12 | 10.0 | 14.0 | 4.0 |
| 6 | Org 2 | 150 | 3 | 10 | 6.0 | 19.0 | 13.0 |
| 7 | Org 2 + Ex. F | 150 + 7.5 | 6 | 16 | 2.8 | 14.0 | 11.2 |
| 8 | Org 2 + Ex. M | 150 + 7.5 | 5 | 12 | 4.4 | 14.0 | 9.6 |
| 9 | Org 2 + Ex. B | 150 + 7.5 | 11 | 19 | 4.0 | 11.0 | 7.0 |
| 10 | Org 2 + Ex. G | 150 + 7.5 | 14 | 21 | 2.8 | 9.0 | 6.2 |

Testing Example 2

Separation of Crude Oil Emulsion from Field 2

The original crude sample contained 1.8% FREE WATER and 24% TOTAL WATER.

Table 2 shows the results after 90 min separation at 40° C. It can be seen that addition of 5% silicone demulsifier (Examples C and M) allowed the use of significantly less organic demulsifiers (30 Instead of 50 ppm) in the presence of Example M.

TABLE 2

Separation results with crude oil sample from Field 2, at 40° C.

| # | Demulsifier | Total Dose ppm | WATER DROP 5 | WATER DROP 10 min | WATER DROP 30 min | WATER DROP 90 min | TOP CUT W1 | TOP CUT W2 | TOP CUT ΔW |
|---|---|---|---|---|---|---|---|---|---|
| 1 | Org 1 | 50 | 6 | 14 | 19 | 25 | 2.8 | 9.0 | 6.2 |
| 2 | Org 1 + Ex. C | 30 + 1.5 | 5 | 10 | 15 | 20 | 8.0 | 20.0 | 12.0 |
| 3 | Org 1 + Ex. M | 30 + 1.5 | 2 | 9 | 14 | 21 | 8.0 | 15.0 | 7.0 |

These test examples demonstrate that the non-cross-linked silicon polyether compositions of the present invention give good separation of crude oil emulsions, and they improve the performance of organic demulsifiers.

It is understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A demulsifying composition comprising a blend of
   a. an emulsion; and
   b. a demulsifying-effective amount of a non-crosslinked silicon polyether, wherein (b) is a non-crosslinked silicon polyether having the following formula;

$$[(R^1O)(C_2H_4O)_a(C_3H_6O)_b(C_4H_8O)_c]_dR^2(R^3)_e(OR^1)_f$$

wherein $R^1$ is a monovalent radical defined as $$M_gM^A_hM^B_iM^H_jM^E_kD_lD^H_mD^E_nT_oT^H_pT^E_qQ_r$$

wherein $M = R^4R^5R^6SiO_{1/2}$;

$M^A = R^7R^8R^9SiR^{10}$;

$M^B = [(R^{11}R^{12}R^{13}Si)_sR^{14}]_tSi(R^{15})_u(R^{16})_vR^{17}$ $M^H = R^{18}Si(R^{19})(R^{20})O_{1/2}$;

$M^E = R^{21}R^{22}R^ESiO_{1/2}$;

$D = R^{23}R^{24}SiO_{2/2}$;

$D^H = R^{25}Si(R^{26})O_{2/2}$;

$D^E = R^{27}R^ESiO_{2/2}$;

$T = R^{28}SiO_{3/2}$;

$T^H = R^{29}SiO_{3/2}$;

$T^E = R^ESiO_{2/2}$; and $Q = SiO_{4/2}$;

where $R^2$ and $R^{14}$ are polyvalent linear or branched unsaturated or saturated hydrocarbon radicals optionally containing heteroatoms and hydroxyl groups subject to the limitation that the valency of $R^2$ and $R^{14}$ is at least two and said $R^2$ and $R^{14}$ each contain less than about 25 carbon atoms;

$R^3$ is $-(C_2H_4O)_{aa}(C_3H_6O)_{bb}(C_4H_8O)_{cc}-R^{30}$ or $R^1$;

$R^{30}$ is a monovalent saturated or unsaturated hydrocarbon radical having from 1 to about 20 carbon atoms;

$R^4, R^5, R^6, R^7, R^8, R^9, R^{11}, R^{12}, R^{13}, R^{15}, R^{16}, R^{19}, R^{20}, R^{21}, R^{22}, R^{23}, R^{24}, R^{26}, R^{27}$, and, $R^{28}$ are each independently selected from the group of monovalent hydrocarbon radicals having from 1 to about 10 carbon atoms;

$R^{31}$ is a monovalent hydrocarbon radical that optionally contains heteroatoms having 1 to about 10 carbon atoms;

$R^{10}, R^{17}, R^{18}, R^{25}$ and $R^{29}$ are each independently selected from the group of divalent hydrocarbon radicals having 1 to about 25 carbon atoms;

$R^E$ is $-R^{32}-(C_2H_4O)_a(C_3H_6O)_b(C_4H_8O)_c-R^{33}$;

$R^{32}$ is a divalent hydrocarbon radical having from 1 to about 60 carbon atoms;

$R^{33}$ is a monovalent saturated or unsaturated hydrocarbon radical having from 1 to about 20 carbon atoms;

subscript h is 0 or 1 subject to the limitation if h is 1 then $g+i+j+k+l+m+n+o+p+q+r=0$;

subscript d is positive subject to the limitation $1<d+e+f\leq$ about 25 subject to the limitation that the sum $d+e+f$ is equal to the valency of $R^2$ and $1<d+f$;

subscripts e and f are zero or less than or equal to 24;

subscripts a, b and c are zero or positive subject to the limitation $0<a+b+c\leq$ about 300;

subscripts aa, bb and cc are zero or positive subject to the limitation $0<aa+bb+cc\leq$ about 300;

subscripts a, h, i, j, k, l, m, n, o, p, q and r are zero to about 300;

subscript s is positive subject to the limitation $0<s<25$ and s is equal to the valency of $R^{14}$ minus 1;

subscripts t, u, and v are zero or positive subject to the limitations $1\leq t$ and $t+u+v$ is equal to about 3; and at least one of the subscripts i, j, m or p are positive or h is one.

2. The demulsifying composition of claim 1 wherein
$R^1$ is $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript b is about 5 to about 50;
subscripts c and e are 0;
subscript d is about 3; and
$R^2$ is a trivalent hydrocarbon having about 3 to about 10 carbon atoms.

3. The demulsifying composition of claim 1 wherein
$R^1$ is $(CH_3)_3SiOSi(R^{25})(CH_3)OSi(CH_3)_3$;
$R^{25}$ is a divalent hydrocarbon with 3-10 carbon atoms;
subscripts a and d are about 4;
subscripts b, c and e are 0; and
$R^2$ is a tetravalent hydrocarbon with 4 to about 20 carbon atoms.

4. The demulsifying composition of claim 1 wherein
$R^1$ and $R^3$ are $(CH_3)_3SiCH_2CH_2Si(CH_3)_2)R^{17}$;
$R^{17}$ is a divalent hydrocarbon having about 3 to about 10 carbon atoms;
subscript a is about 5 to about 50;
subscript b is 0 to about 10;
subscript c is 0;

$R^2$ is $CH_3CH_2C(CH_2-)_2(CH_2O-)$ where $R^3$ is connected to the 0 atom in $R^2$;
subscript d is about 2; and
subscript e is about 1.

5. The demulsifying composition of claim 1 wherein
$R^1$ and $R^3$ are $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript d is about 2;
subscript e is about 1;
subscripts b and c are each 0; and
$R^2$ is $CH_3CH_2C(CH_2-)_2(CH_2O-)$ where $R^3$ is connected to the 0 atom in $R^2$.

6. The demulsifying composition of claim 1 wherein
subscript d is 0;
$R^1$ is $M^E D_l M^H$;
$M^E$ is $R^{33}O(CH_2CH_2O)_a(CH_2CH_2(CH_3)O)_b(CH_2CH_2(CH_2CH_3)O)_c R^{32}$
$R^{32}$ is a divalent, linear or branched hydrocarbon radical having 3 to about 6 carbon atoms;
$R^{33}$ is H, $CH_3C(=O)O-$, or a monovalent hydrocarbon radical having 1 to about 10 carbon atoms;
$M^H = R^{18}Si(R^{19})(R^{20})O_{1/2}$;
$D = R^{23}R^{24}SiO_{2/2}$;
$R^{18}$ is a linear or branched monovalent hydrocarbon radical having 3 to about 10 carbon atoms;
$R^{19}, R^{20}, R^{23}$ and $R^{24}$ are monovalent hydrocarbon radicals having 1 to about 3 carbon atoms;
subscript a is about 5 to about 50;
subscripts b and c are about 0 to about 50;
subscript l is 0 to about 300;
$R^2$ is a hydrocarbon radical having about 3 to about 12 carbon atoms with a valency in the range of about 2 to about 6;
subscript f is about 2 to about 6.

7. The demulsifying composition of claim 1 further comprising at least one organic or silicone demulsifier.

8. The demulsifying composition of claim 7 wherein the ratio of said demulsifying-effective amount of non-crosslinked silicon polyether composition (b) to the total amount of the organic and silicone demulsifiers is in the range of about 100:1 to about 1:1000.

9. The demulsifying composition of claim 7 wherein the ratio of said demulsifying-effective amount of non-crosslinked silicon polyether composition (b) to the total amount of the organic and silicone demulsifiers is in the range of about 5:1 to about 1:200.

10. The demulsifying composition of claim 1 wherein the ratio of said demulsifying-effective amount of non-crosslinked silicon polyether composition (b) to said emulsion component (a) is about 0.00001 to about 1 part of (b) to about 100 parts of (a).

11. A method for separating emulsions comprising:
(i) incorporating a demulsifying-effective amount of a non-crosslinked silicon polyether (b) of claim 1 into an emulsion to produce a new emulsion;
(ii) allowing said new emulsion to separate into at least two phases; and
(iii) separating said at least two phases from each other.

12. The method for separating emulsions of claim 11 wherein
$R^1$ is $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript b is about 5 to about 50;
subscripts c and e are 0;
subscript d is about 3; and
$R^2$ is a trivalent hydrocarbon having about 3 to about 10 carbon atoms.

13. The method for separating emulsions of claim 11 wherein
$R^1$ is $(CH_3)_3SiOSi(R^{25})(CH_3)OSi(CH_3)_3$;
$R^{25}$ is a divalent hydrocarbon with 3-10 carbon atoms;
subscript a and d are about 4;
subscript b, c and e are 0; and
$R^2$ is a tetravalent hydrocarbon with 4 to about 20 carbon atoms.

14. The method for separating emulsions of claim 11 wherein
$R^1$ and $R^3$ are $(CH_3)_3SiCH_2CH_2Si(CH_3)_2)R^{17}$;
$R^{17}$ is a divalent hydrocarbon having about 3 to about 10 carbon atoms;
subscript a is about 5 to about 50;
subscript b is 0 to about 10;
subscript c is 0;
$R^2$ is $CH_3CH_2C(CH_2\text{—})_2(CH_2O\text{—})$ where $R^3$ is connected to the 0 atom in $R^2$;
subscript d is about 2; and
subscript e is about 1.

15. The method for separating emulsions of claim 11 wherein
$R^1$ and $R^3$ are $(CH_3)_3SiOSi(R^{25})(CH_3)OSi(CH_3)_3$;
$R^{25}$ is a divalent hydrocarbon having about 3 to about 10 carbon atoms;
subscript a is about 5 to about 50;
subscript d is about 2;
subscript e is about 1;
subscripts b and c are each 0; and
$R^2$ is $CH_3CH_2C(CH_2\text{—})_2(CH_2O\text{—})$ where $R^3$ is connected to the 0 atom in $R^2$.

16. The method for separating emulsions of claim 11 wherein
subscript d is 0;
$R^1$ is $M^E D_l M^H$;
$M^E$ is $R^{33}O(CH_2CH_2O)_a(CH_2CH_2(CH_3)O)_b(CH_2CH_2(CH_2CH_3)O)_c R^{32}$
$R^{32}$ is a divalent, linear or branched hydrocarbon radical having 3 to about 6 carbon atoms;
$R^{33}$ is H, $CH_3C(=O)O\text{—}$, or a monovalent hydrocarbon radical having 1 to about 10 carbon atoms;
$M^H = R^{18}Si(R^{19})(R^{20})O_{1/2}$;
$D = R^{23}R^{24}SiO_{2/2}$;
$R^{18}$ is a linear or branched monovalent hydrocarbon radical having 3 to about 10 carbon atoms;
$R^{19}, R^{20}, R^{23}$ and $R^{24}$ are monovalent hydrocarbon radicals having 1 to about 3 carbon atoms;
subscript a is about 5 to about 50;
subscripts b and c are about 0 to about 50;
subscript l is 0 to about 300;
$R^2$ is a hydrocarbon radical having about 3 to about 12 carbon atoms with a valency in the range of about 2 to about 6;
subscript f is about 2 to about 6.

17. The method for separating emulsions of claim 11 further comprising at least one organic or silicone demulsifier.

18. The method for separating emulsions of claim 17 wherein the ratio of said demulsifying-effective amount of non-crosslinked silicon polyether composition (b) to the total amount of the organic and silicone demulsifiers is in the range of about 100:1 to about 1:1000.

19. The method for separating emulsions of claim 17 wherein the ratio of said demulsifying-effective amount of non-crosslinked silicon polyether composition (b) to the total amount of the organic and silicone demulsifiers is in the range of about 5:1 to about 1:200.

20. The method for separating emulsions of claim 11 wherein the ratio of said demulsifying-effective amount of non-crosslinked silicon polyether composition (b) to said emulsion component (a) is about 0.00001 to about 1 part of (b) to about 100 parts of (a).

* * * * *